United States Patent [19]

Ewert

[11] 4,116,467

[45] Sep. 26, 1978

[54] OUTRIGGER

[75] Inventor: Russ J. Ewert, Calgary, Canada

[73] Assignee: Canadian Foremost Ltd., Canada

[21] Appl. No.: 760,715

[22] Filed: Jan. 19, 1977

[30] Foreign Application Priority Data

Feb. 16, 1976 [CA] Canada ..................................... 245819

[51] Int. Cl.[2] ............................................. B60S 9/10

[52] U.S. Cl. ..................................... 280/764; 212/145; 254/86 H

[58] Field of Search ......................... 212/145; 280/764; 254/86 H, 45

[56] References Cited

U.S. PATENT DOCUMENTS

| | | | |
|---|---|---|---|
| 3,310,181 | 3/1967 | Symmank | 212/145 |
| 3,337,063 | 8/1967 | Testore | 212/145 |
| 3,570,692 | 3/1971 | Andersen et al. | 212/145 |
| 3,603,614 | 9/1971 | Gauchet | 212/145 |

FOREIGN PATENT DOCUMENTS

| | | | |
|---|---|---|---|
| 698,737 | 11/1964 | Canada | 212/145 |
| 713,937 | 7/1965 | Canada | 212/145 |
| 757,938 | 5/1967 | Canada | 212/145 |
| 763,298 | 7/1967 | Canada | 212/145 |
| 938,604 | 12/1973 | Canada | 212/145 |
| 965,075 | 3/1975 | Canada | 212/145 |
| 1,465,606 | 12/1966 | France | 212/145 |

*Primary Examiner*—Robert C. Watson
*Attorney, Agent, or Firm*—Lane, Aitken, Dunner & Ziems

[57] ABSTRACT

An outrigger for stabilizing the frame of a mobile apparatus such as a vehicle with a lifting device mounted thereon. The outrigger includes a pivoted arm mounted on the frame and a main hydraulic jack for swinging the arm from a raised or retracted position for travel of the vehicle to a lowered ground engaging position upon expansion of the jack. The upper or inner end of the jack is mounted on means for swinging the inner end of the jack inwardly relative to the frame and this means may be in the form of a link pivotally connected at its inner end to the frame and at its outer end to the inner end of the jack. A secondary jack may be connected between the link and the frame so as to swing the link inwardly. The swing of the outrigger arm is thus significantly increased over known arrangements so as to permit the outrigger to travel from a point well below the normal ground level to a retracted position which will permit highway travel.

6 Claims, 2 Drawing Figures

OUTRIGGER

This invention relates to an outrigger for a mobile apparatus such as a crane carrying vehicle.

Many mobile units such as vehicles having cranes or shovels mounted thereon are equipped with a number of outriggers which may be moved to a ground engaging position for stabilizing the unit during hoisting or digging. If the unit is being operated on uneven terrain it is desirable to be able to locate the ground engaging pad of the outrigger well below the normal wheel level of the vehicle. When in the inoperative or travelling position, the outrigger must be in a position within certain dimensions of the vehicle to permit travel of the vehicle, particularly on public roadways. There are in use outriggers of a very complex structure which permit various adjustments to the outrigger, and some units are equipped with outriggers which are removable so as to permit the vehicle to travel on roadways. The most common outrigger, which includes a swinging outrigger arm operated by a single hydraulic jack, is not capable of enough travel to move from a position well below the wheel level to a fully retracted position.

It is an object of the present invention to provide an outrigger with ample swing of the outrigger arm and yet of relatively simple construction.

According to one aspect of the present invention there is provided an outrigger having an outrigger arm which is pivotally connected at its inner end to the frame of the apparatus and is provided with a ground engaging outer end. A main hydraulic jack is pivotally connected at its outer end to the arm at a point outwardly on the arm, and the jack is connected at its inner end to means arranged to displace the inner end of the jack inwardly relative to the frame. Contraction of the jack accomplishes swinging of the arm to an intermediate position while movement of the inner end of the jack pulls the arm to a fully retracted position.

According to one embodiment of the invention the means for moving the inner end of the jack includes a link pivotally connected at an inner end thereof to the frame and an outer end thereof to the inner end of the jack. Motor means swing the link between an extended and a retracted position relative to the frame.

The motor means may be in the form of a secondary hydraulic jack which is pivotally connected at its outer end to the link and at an inner end to the frame.

Figure 2:
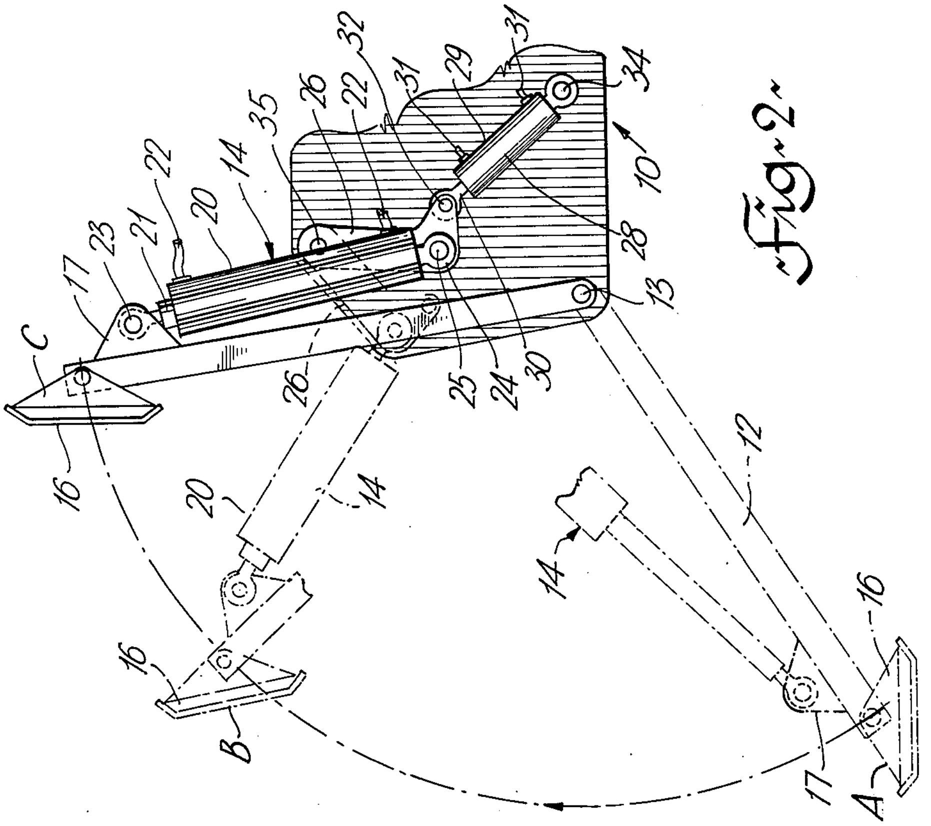
Figure 1:
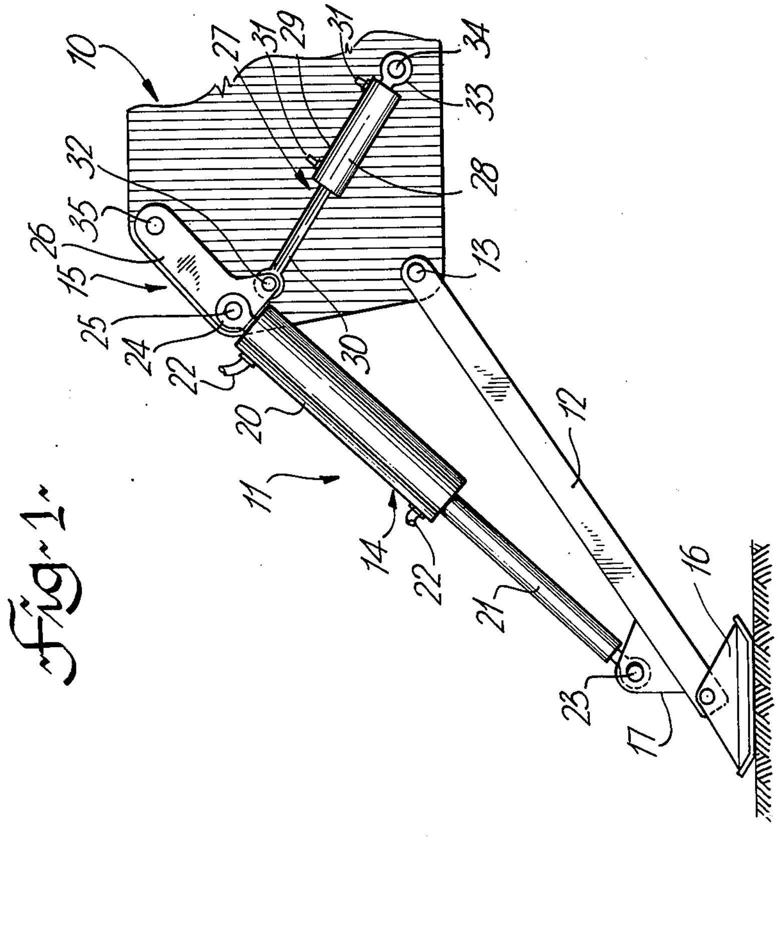

In the accompanying drawings, which shown one embodiment of the invention as an example:

FIG. 1 is a side view of the outrigger in a lowered or operative position; and FIG. 2 is a side view similar to FIG. 1, but showing the outrigger in a raised or retracted position, a portion of the outrigger being shown in outline in the lowered position and in an intermediate position.

In the drawings reference number 10 denotes a portion of a frame of a mobile apparatus or vehicle requiring stabalization by an outrigger generally denoted by the reference member 11. The outrigger 11 includes an outrigger arm 12 which is a rigid member which is connected at its inner end to the frame 10. The arm 12 is connected by way of a pivot connection 13 which permits the arm to swing about a substantially horizontal axis from a lowered or ground engaging position as shown in full lines in FIG. 1 to a retracted position as shown in FIG. 2. The outrigger further includes a main hydraulic jack 14 which, upon contraction, raises the arm 12, and the inner end of the jack 14 is connected by way of an auxiliary means 15 which is capable of displacing the inner end of the jack inwardly during the raising operation so as to increase the travel of the arm 12 and thereby achieve maximum retraction.

The outrigger arm is provided with ground engaging means at its outer end in the form of a pivotally mounted pad 16. At a point removed from pivot connection 13, and in the example shown, at a point adjacent the outer end of the arm, the arm is provided with a lug 17. The main hydraulic jack 14 includes a cylinder 20 which encloses a piston (not shown) having a piston rod 21 projecting from an end of the cylinder. The jack 14 is of a double acting type and has fluid pressure lines 22,22 connected to opposite ends thereof. The flow of fluid in lines 22,22 is controlled by a control valve (not shown) so as to selectively cause expansion and contraction of the jack 14. An outer end of the piston rod 21 is pivotally connected by way of a pivot connection 23 to the lug 17 of outrigger arm 12. At the inner end of the jack, the cylinder is provided with an eye 24 which forms part of a pivot connection 25. The pivot connection 25 pivotally connects the inner end of the jack 14 to auxiliary means 15.

The auxiliary means 15 includes a link 26 and a motor 27. The link 26 is connected at its inner end to the frame 10 by way of a pivot connection 35 and at its outer end to the inner end of the jack 14 by way of the pivot connection 25. The motor 27 is in the form of a secondary hydraulic jack 28 including a cylinder 29, having a piston (not shown) to which there is connected a piston rod 30 projecting from one end of the cylinder. Hydraulic lines 31,31 are connected to opposite ends of the cylinder 29, the flow of fluid in the lines 31,31 being controlled by a control valve (not shown). The jack 28 is thus double acting so that it may be selectively expanded or contracted. The piston rod 30 is pivotally connected by way of a pivot connection 32 to the outer end of the link 26, and the inner end of the jack 28 is pivotally connected to the frame 10 by way of an eye 33 forming part of a pivot connection 34.

Each of pivot connections 23, 25, 35, 32 and 34 permit pivoting of the parts which they connect about an axis substantially parallel to the axis of pivot provided by pivot connection 13.

When the outrigger is in an extended or operative position A, FIG. 2, jack 28 is fully extended and jack 14 is extended to the extent required to force pad 16 into engagement with the ground and thus provide stabilization of the frame. When jack 14 is fully contracted the outrigger arm is moved to a partially raised intermediate position shown at B in FIG. 2. Upon full contraction of secondary jack 28, the inner end of main jack 14 is pulled inwardly which swings the outrigger arm to a fully retracted position. It may be seen, therefore, that although a relatively simple structure of a compact nature is utilized, travel through a large arc is obtained so that the ground engaging pad may be moved between a retracted position which allows roadway travel and a lowered or extended position well below normal wheel level.

The relationship of the jack 14, link 26 and jack 28 may be such that when jack 28 is fully extended, as would be its normal positioning when the outrigger is being used, the pivot connection 25 is pushed overcentre relative to the pivot connections 23 and 30 so that the combination of jack 14 and link 26 in effect becomes a rigid member and thereby increases the safety of outrigger.

The auxiliary means may be constructed differently. For example, instead of using the link 26, the inner end of the jack could be pivotally connected to a member mounted in a slide track, which member is pulled inwardly relative to the frame by a hydraulic or screw jack device.

Other variations which are within the spirit of the invention as defined in the claims will be obvious to those skilled in the art.

The embodiments of the invention in which an exclusive property or privilege is claimed are defined as follows:

1. An outrigger for stabilizing the frame of a mobile apparatus, said outrigger comprising:

an outrigger arm consisting of a ground engaging outer end and a frame engaging inner end, the inner end being pivotally connected to the frame by way of pivotal means fixed relative to said frame;

a main hydraulic jack pivotally connected at the outer end thereof to said arm at a point outward of said inner end of the arm;

means connecting the inner end of said jack to the frame for forcing displacement to the inner end of the jack inwardly relative to the fixed pivot means and the frame.

2. An outrigger for stabilizing the frame of a mobile apparatus, said outrigger comprising:

an outrigger arm pivotally connected at its inner end to the frame and having a ground engaging outer end;

a main hydraulic jack pivotally connected at the outer end thereof to said arm at a point outward of said inner end of the arm;

means connecting the inner end of said jack to the frame and arranged to displace the inner end of the jack inwardly relative to the frame, said means including a link pivotally connected at an inner end thereof to the frame and at an outer end thereof to the inner end of said jack, and motor means for swinging said link between extended and retracted positions relative to the frame.

3. An outrigger as defined in claim 2, wherein said motor means includes a secondary hydraulic jack pivotally connected at an outer end to said link and at an inner end to said frame.

4. An outrigger as defined in claim 3, wherein said secondary jack is arranged to pull said link to the retracted position upon contraction of said secondary jack.

5. An outrigger for stabilizing the frame of a mobile apparatus, said outrigger comprising an outrigger arm including a rigid member pivotally connected to the frame and having a ground engaging outer end, a link having an outer end and a pivot connection between an inner end thereof and the frame, motor means connected between said frame and said link and arranged to swing the outer end of said link from a retracted position to an extended position, a main hydraulic jack having pivot connections at opposite ends thereof and joining said jack between the outer end of said link and said member whereby expansion of said jack, when said link is in the extended position, moves said arm into a stabilizing position, said motor means including a secondary hydraulic jack pivotally connected at one end to the frame and at the other end to the link, said jack being arranged upon contraction to swing the pivot connection between the main jack and the link inwardly relative to the frame, expansion of said secondary jack swinging the pivot connection between the main jack and the link outwardly to an overcentre position relative to the pivot connection of the inner end of the link and the pivot connection between the main jack and the arm.

6. An outrigger for stabilizing the frame of a mobile apparatus, said outrigger comprising:

an outrigger arm including a rigid member connected at an inner end thereof to the frame for pivotal movement about a substantially horizontal axis, said rigid member having ground engaging means at an outer end thereof;

a link connected at an inner end to the frame for pivotal movement about a second axis parallel to and above the first axis;

a main hydraulic jack pivotally connected between an outer end of the link and said arm at a point on said arm removed from said inner end and arranged upon contraction thereof to raise said arm from an extended position to an intermediate raised position; and a secondary hydraulic jack pivotally connected at one end to said frame for pivotal movement about an axis parallel to and below and inward from said second axis, said second jack being pivotally connected at its outer end to said link at a point outwardly of its inner end and being arranged upon contraction thereof to raise said arm from said intermediate position to a fully retracted position.

* * * * *